United States Patent [19]
Hess et al.

[11] Patent Number: 5,170,413
[45] Date of Patent: Dec. 8, 1992

[54] CONTROL STRATEGY FOR REUSE SYSTEM ASSIGNMENTS AND HANDOFF

[75] Inventors: Garry C. Hess, Elgin; Mark A. Birchler, Roselle, both of Ill.

[73] Assignee: Motorola, Inc., Schaumburg, Ill.

[21] Appl. No.: 632,578

[22] Filed: Dec. 24, 1990

[51] Int. Cl.$^5$ ............. H04K 1/10; H04L 27/28
[52] U.S. Cl. ................................. 375/38; 375/40; 375/100; 375/109; 370/69.1; 455/59; 455/71
[58] Field of Search ............... 375/38, 39, 40, 97, 375/109, 100; 455/51, 59, 60, 71, 52, 133, 135; 370/69.1

[56] References Cited

U.S. PATENT DOCUMENTS

| | | | |
|---|---|---|---|
| 4,358,853 | 11/1982 | Qureshi | 375/39 |
| 4,466,109 | 8/1984 | Sari | 375/39 |
| 4,613,975 | 9/1986 | Aoyagi et al. | 375/40 |
| 4,768,187 | 8/1988 | Marshall | 370/69.1 |
| 4,866,739 | 9/1989 | Agazzi et al. | 375/102 |
| 4,881,241 | 11/1989 | Pommier et al. | 375/38 |
| 4,899,367 | 2/1990 | Sampei | 375/39 |
| 4,910,467 | 3/1990 | Leitch | 375/97 |
| 4,912,773 | 3/1990 | Schiff | 455/71 |

Primary Examiner—Curtis Kuntz
Assistant Examiner—Young Tse
Attorney, Agent, or Firm—Jon Christensen

[57] ABSTRACT

Disclosed is a method of selecting a relatively high reliability signal path between a mobile communication unit and a number of possible base sites.

2 Claims, 10 Drawing Sheets

SYNCHRONIZATION MATCHED FILTER
(FOR GENERAL CASE WHERE ZERO-IF
SYNCHRONIZATION WAVEFORM
IS $S(T)=S_R(T)+ JS_i(T)$)

FIG. 6A

SYNCHRONIZATION MATCHED FILTER
(FOR CASE WHERE ZERO-IF
SYNCHRONIZATION WAVEFORM
S(T) IS REAL-VALUED

CONTROL STRATEGY FOR REUSE SYSTEM ASSIGNMENTS AND HANDOFF

FIELD OF THE INVENTION

This invention relates to communication systems, including but not limited to trunked mobile communication systems.

BACKGROUND OF THE INVENTION

Trunked, mobile communication systems are known. Such systems typically allocate communication resources upon perception of a need for communication services. Such allocation, in some systems, is under control of a resource controller. In other systems, a communication unit searches for an unused communication resource, and upon identification of such resource, seizes possession of such resource.

Upon receipt of an allocation of a communication resource communication units tune to allocated frequencies and begin transceiving an information signal over an allocated bandwidth. Transmissions between communication units or between a communication unit and a subscriber on a public service telephone network may continue until the end of a conversation or until one of the communication units exceeds the range of his transceiver.

Trunked communication systems in which information signals are encoded using quadrature amplitude modulation (QAM) are also known. Such systems combine characteristics of both phase and amplitude modulation to reduce the bandwidth required to carry a fixed amount of information. In QAM, information is conveyed using changes in both the amplitude of a carrier wave and the relative phase angle of the carrier signal with respect to a reference angle. Because of the multi-dimensional aspect of QAM four or more bits of digital data may be transmitted per QAM signal element.

Multi-carrier QAM is a technique in which an information-bearing signal, such as serial digitized voice, or digital data from a computer for example, is divided up into multiple, separate, frequency division multiplexed QAM signals. Each QAM signal occupies a discrete frequency band (with each of the bands being substantially frequency adjacent to the others) and carries a portion of the information in the complete information-bearing signal.

In order to coherently detect the transmitted data, the receiver must be able to measure and correct phase and amplitude variations induced by the transmission channel. The variations may be induced by multiple path signal propagation and are commonly referred to as fading.

Two types of fading can occur over the transmission channel. The types are differentiated by the ratio of the differential delays between multiple signal paths and the transmitted bit period. If the maximum differential delay between significant signal paths is much less than the bit period, then the fading process is referred to as flat fading. The term, flat fading, applies because the channel appears to vary uniformly across the transmission bandwidth as a function of time (i.e. flat across the signal bandwidth). If the maximum differential delay between significant signal paths is comparable to or greater than the bit period, then the fading process is referred to as frequency selective fading. In the case of frequency selective fading the channel variation is a function of frequency within the frequency bandwidth.

The means by which phase and amplitude variations are measured and corrected is based upon a process of inserting known pilot symbols in the transmitted signal stream at fixed intervals. The process of inserting known symbols at predetermined intervals in the data symbol stream is commonly referred to as a time division multiplex (TDM) pilot reference.

At the receiver, the location of the known pilot symbols is determined by a time synchronization process. The difference between the amplitude and phase of the transmitted and received pilot symbols is the variation induced by the channel. An interpolation filter is used to generate channel variation values for the intervening data symbols. The channel variation values are then used to correct for channel variation, resulting in relativly accurate estimates of the transmitted symbols.

When multi-channel transmission is used, each sub-channel may experience its own unique variation due to frequency selective fading. To allow for such unique variation, and to provide a mechanism for correction of such variation, each sub-channel may contain pilot symbols.

In the context of geographic reuse the limiting factor in the quality of a received signal is co-channel interference. Co-channel interference may be caused by reception of unwanted signals on the same frequency as the desired signal.

Attempts to increase the quality of a transmitted signal often include increasing the power level of a transmitted signal. Increasing the power level of a transmitted signal increases the ratio of signal to noise and, consequently, decreases the effect of co-channel interference. Increasing the power level of a transmitted signal often times does result in a higher quality received signal. Increasing the power level, on the other hand, often also results in an expansion of the geographic area within which the resource may not be re-used by other communication systems.

Other attempts to provide a higher quality received signal include implementing search algorithms to identify a signal path exhibiting the least amount of co-channel interference. Such algorithms in some cases involve measuring the quality of a signal received on different communication resources from different sources to identify the resource, and signal source, providing the highest reliability in terms of received signal quality. Methods used in the prior art to identify high reliability resources include signal strength measurements and measurement of bit error rates.

Shown (FIG. 12) is a graph of a computer simulation of probability of bit error versus $E_b/N_o$ (energy per bit divided by noise in a one Hertz bandwidth). The graph, as is known, gives a substantially accurate representation of error rates under a variety of transmitting environments. Transmitting environments offered include $S=0$ μs delay spread (flat Rayleigh) to $S=10$ μs delay spread (very bad hilly).

Figures 12, 14:
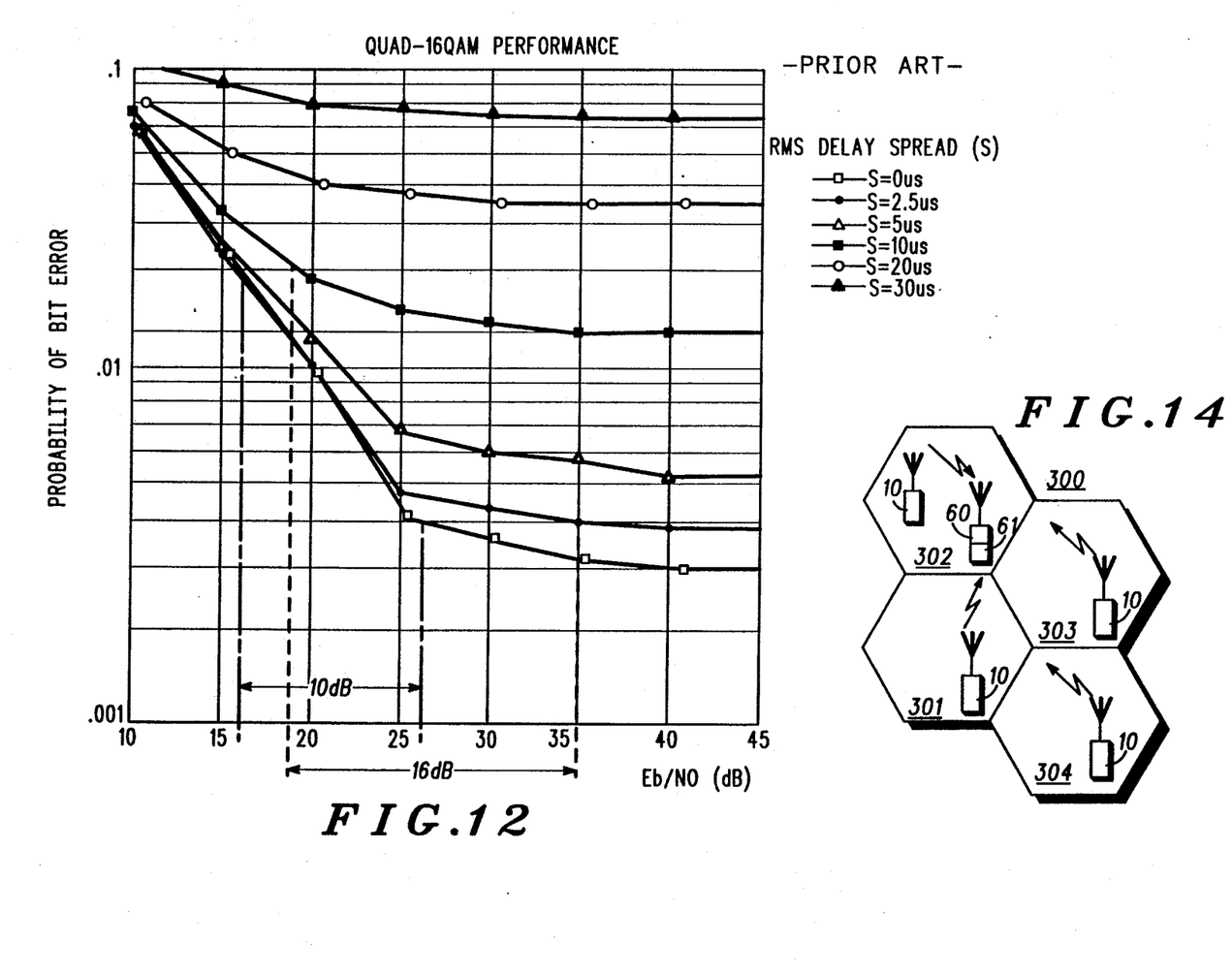
FIG. 12 comprises a computer simulation of bit error rates under a number of operating conditions.
FIG. 14 comprises a receiver and delay spread measurement device within a communication unit.

The information shown in FIG. 12, as is known, is also commonly displayed using an ordinate calculated in terms of $C/[I+N]$ where C is signal, I is interference and N is noise. The two methods of displaying bit error rates, as is known to those in the art, are used substantially interchangeably.

In the context of communications between a communication unit and a transceiver at a base site the identification of the highest reliability communication resource is often a measurement of proximity of the closest base site transceiver. The closest base site often provides the strongest signal. Signal strength or bit error rate measurements may often provide similar results in terms of resource reliability when used to identify the communication resource providing access to the closest communication services provider.

Bit error rate calculations, on the other hand, are time consuming. Where error rates are low a significant time interval must be allotted to accumulating and averaging errors.

Signal strength measurements, though quick and easy to implement, do not directly measure resource reliability. Resource reliability in the most direct manner involves minimal bit error rates. Minimal bit error rates, on the other hand, involve resource resistance to short term interference factors such as frequency selective fading or short term signal strength variations.

While, in the past, signal strength or bit error rate measurements have provided good indication of the reliability of a communication resource such measurements do not give indication of the effects of certain types of interference exemplified by frequency selective fading. Frequency selective fading may affect certain aspects of a received signal, thereby degrading signal quality, without appreciably affecting signal strength.

By way of example the following comparison is offered wherein a communication unit compares the reliability of communication resources between the communication unit and two base sites. The maximum allowable bit error rate is two percent. The first base site has a detected bit error rate of 0.5% and 26 dB $E_b/N_o$ with S=0 (flat Rayleight fading). The second base site has a detected error rate of 1.3% and 35 dB $E_b/N_o$ with S=10 µs (very bad hilly). The results can be seen plotted on FIG. 12. The first site shows a 10 dB link margin between the 0.5% error rate (26 db) and 2% error (16 dB). The second site shows a 16 dB link margin between the 1.3% error rate (35 dB) and 2% error (19 dB).

In the example given the lowest bit error rate does not offer the highest reliability in terms of signal reception. While the first site offers a lower bit error rate, log-normal fluctuations in received power levels may disrupt signal reception in excess of allowable standards. Clearly the second site while offering a higher initial error rate offers the highest reliability signalling channel.

While the example offered provides an indication of channel reliability, use of such an algorithm depends upon provisions within the receiver for measuring delay spread. Measurement of delay spread is well known in the art (see "900-MHz Multipath Propagation Measurements for U.S. Digital Cellular Radiotelephone", IEEE Transactions, Vol. 39, No. 2, May 1990, pages 132–139) and allows a receiver to enter such a graph (FIG. 12) based upon measured delay spread and bit error rate for each measured channel. Such an algorithm, as is known, may be used to gain a measurement of reliability of communication resources between base site transmitters and a mobile communication unit.

Measurement of bit error rates, as has been mentioned, is time consuming. Where bit error rates are low a number of measurements may need to be undertaken to ensure reliable data. A communication units seeking handoff may not have time to measure bit error rates in an environment of a rapidly deteriorating received signal.

Because of the importance of mobile communications a need exists for a method of measuring signal quality (reliability of a communication resource) that can be rapidly calculated from easily measured parameters and which takes into account such affects as frequency selective fading. Such a method should give a indication of instantaneous as well as average reliability of communication resources and be subject to rapid evaluation. Such a method would be useful both from the viewpoint of handoff of communication units between base sites but also in terms of selection of an initial base site to initiate a communication transaction.

SUMMARY OF THE INVENTION

Pursuant to one embodiment of the invention a method is offered of selecting a high reliability signal path between a communication unit and a number of base site transmitters where each base site transmitter is transmitting an information signal. The method is based upon a comparison of measured delay spreads and average signal quality factors calculated from measured signal parameters. The delay spread and signal parameters are measured by the communication unit from information signals received from at least some of the base site transmitters.

The method includes measuring a delay spread and calculating a signal quality factor from measured signal parameters of a first information signal received from a first base site of the number of base site. A first link margin is then determined based upon the measured delay spread and the calculated signal quality factor of the first information signal.

A delay spread is measured and a signal quality factor is calculated from measured signal parameters of an at least second information signal received from an at least second base site of the number of base sites. A second link margin is determined based upon the delay spread and signal quality factor of the at least second information signal. A high reliabilty signal path is then selected based, at least in part, upon the highest relative link margin.

DESCRIPTION OF A PREFERRED EMBODIMENT

Figure 1:
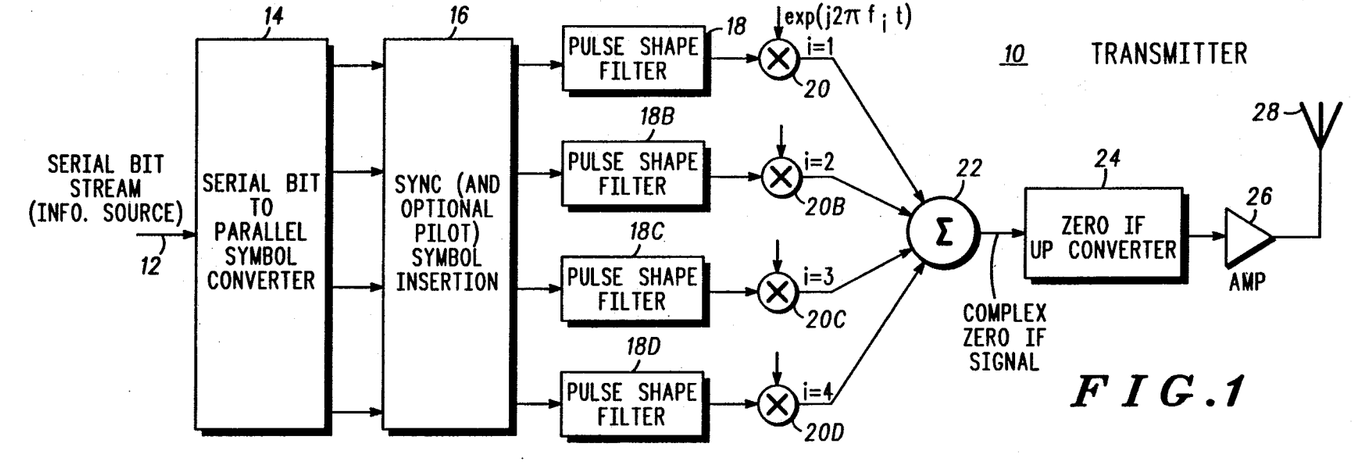
FIG. 1 comprises a QUAD 16 QAM transmitter.

FIG. 1 shows a simplified block diagram of a four subchannel QAM transmitter (10). The QAM transmitter (10) formats information from a serial data source (12) into four subchannels, wherein each subchannel carries a fractional amount of the information in the original serial bit stream (12). The serial bit stream (12) may originate from virtually any particular source and may be digitized voice information, data from a computer or the like, or any other similar source of such information.

The serial bit stream (12) is reformatted by a serial to parallel converter (14), which divides the serial bit stream into four different data streams. In the embodiment shown, the serial to parallel converter (14) formats 16 bits of serial data from the serial data source (12) into four, four bit data words. The data words from the serial to parallel converter (14) form a stream of discrete samples of information from the serial bit stream (12). In the embodiment shown, in this case, the discrete samples can be represented by 16 QAM symbols, which correspond to the sixteen points in the constellation shown in FIG. 7.

Figure 7:
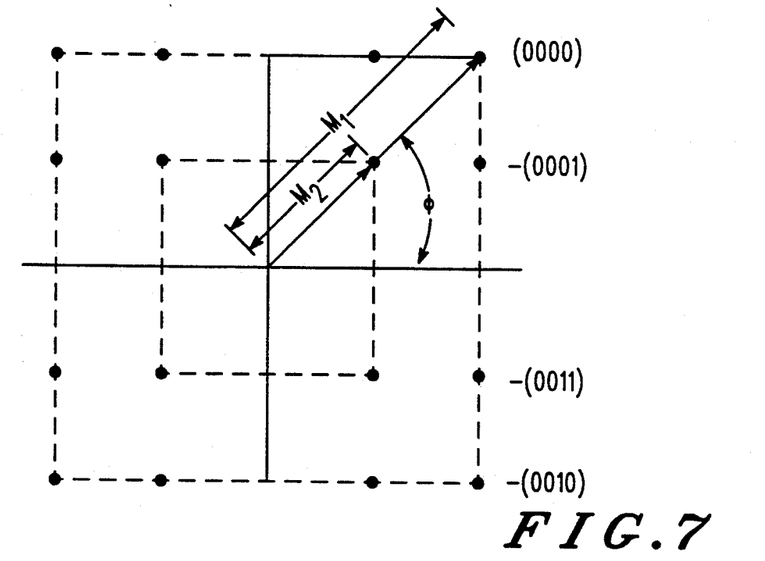
FIG. 7 depicts a QUAD 16 QAM constellation.

FIG. 7 shows a constellation map of a 16 level QAM signal. Each point of this constellation map is assigned a binary bit pattern corresponding to every possible binary bit pattern representable by four bits. For example, a bit pattern produced by the serial to parallel converter (14) of all zeros might be represented by a vector with magnitude M1, at 45 degrees. This vector might be transmitted as a carrier wave of a certain amplitude M1 and with a certain phase-shift of $\phi 1$, identifiable by a receiver as a 45 degree phase shift from some other reference value.

Synchronization and pilot symbols are inserted in a sync insertion block (16) as shown. (The actual symbols might be generated by a microcomputer, a suitable digital signal processor, or other suitable device.) Since the data from the serial to parallel converter (14) is a stream of samples, the synchronization and pilot symbols are also discrete samples of information. The output of the symbol insertion block (16) is coupled to a pulse shaping filter (18) which band limits the frequency spectrum of the composite signals from the symbol insertion block (18).

The output of the pulse shaping filter (18) is coupled to a modulator (20) which multiplies the output of the pulse shaping filter (18) by a sine wave quantity equal to $e^{(j2\pi f_i t)}$ where i runs from 1 to 4. The output of the first modulator stage (20) is a complex zero IF signal which is summed together in a summer (22) with the signals from other pulse shaping filters and modulators (18b through d and 20b through d, respectively) as shown.

The complex zero IF output from the summer (22) is frequency shifted by an IF up-converter, or modulator (24) to some carrier frequency, $f_o$, amplified by an RF Amplifier (26) for subsequent broadcasting on an antenna (28). Each of the QAM subchannels broadcast from the antenna occupies its own frequency spectrum as a result of the modulation process used in the transmitter (10).

Figure 2:
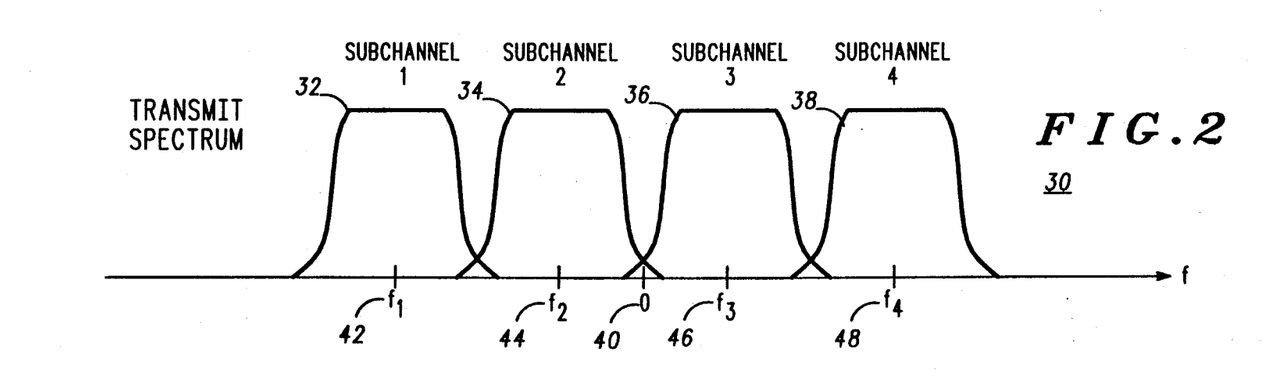
FIG. 2 comprises four subchannels transmitted by a QUAD 16 QAM transmitter.

FIG. 2 shows a representation of the transmit energy spectrum output from the transmitter (10) shown in FIG. 1 with four subchannels (32, 34, 36, and 38) centered about a center frequency $f_o$. Note that each subchannel (32, 34, 36, and 38) has its own center frequency $f_1+f_o$, $f_2+f_o$, $f_3+f_o$, and $f_4+f_o$ respectively (42, 44, 46, and 48 respectively).

Figure 3:
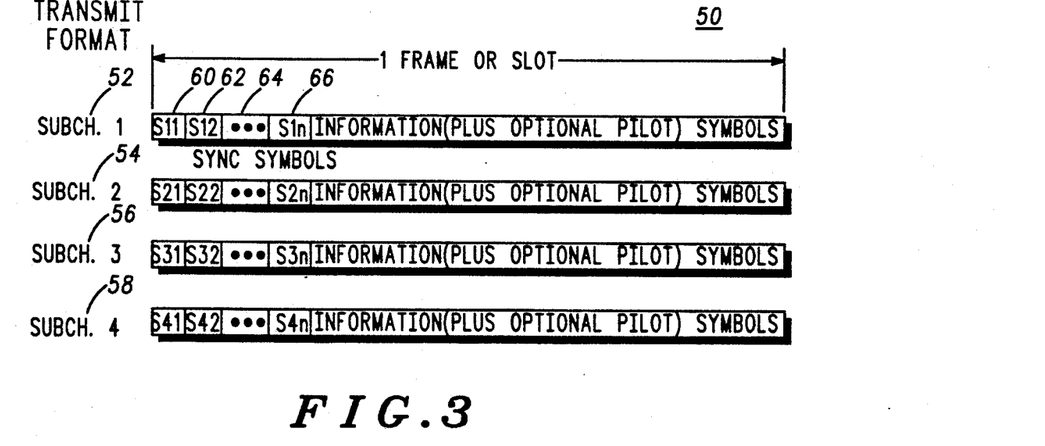
FIG. 3 depicts data frames within each subchannel within a transmitted QUAD 16 QAM signal.

FIG. 3 shows a representative diagram of the information that might be present on each of the subchannels 1 through 4 shown in FIG. 2. Note that subchannel 1 (52) is shown with a series of synchronizing sequences designated $S_{11}$, $S_{12}$, through $S_{1n}$. (These synchronizing sequences might be described as a sequence of symbols, represented as vectors that permit synchronization.) Subchannel 2 (54) has its own series of sychronizing symbols $S_{21}$, $S_{22}$, through $S_{2n}$. Similarly, subchannels 3 and 4 (56 and 58) have sync symbols $S_{31}$ through $S_{3n}$, and $S_{41}$ through $S_{4n}$ respectively. These synchronizing sequences are complex values added to the information within subchannels 1 through 4 and are preselected values to simplify detection and decoding by a QAM receiver.

Figure 4:
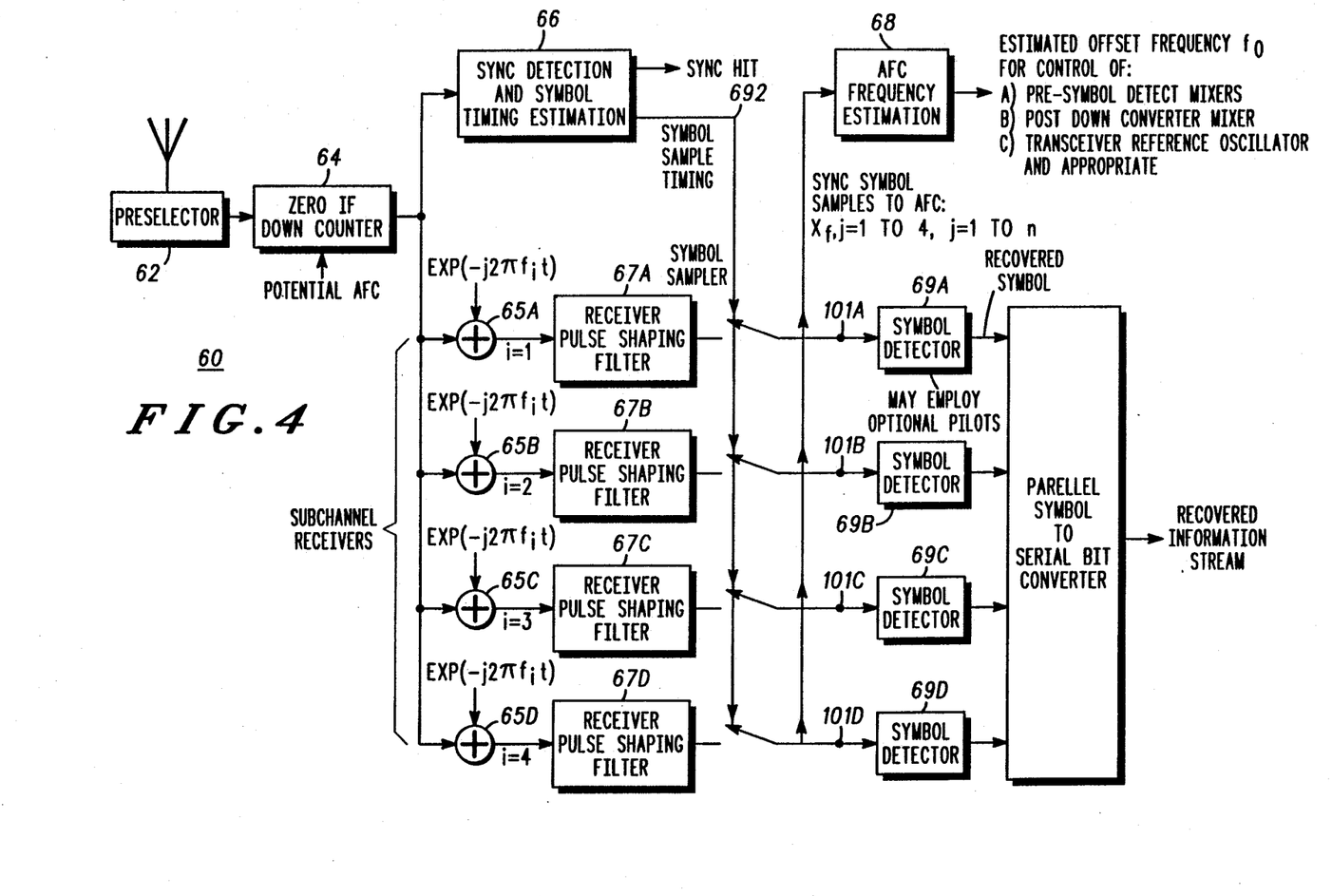
FIG. 4 comprises a block diagram of a QUAD 16 QAM receiver.
Figure 16:
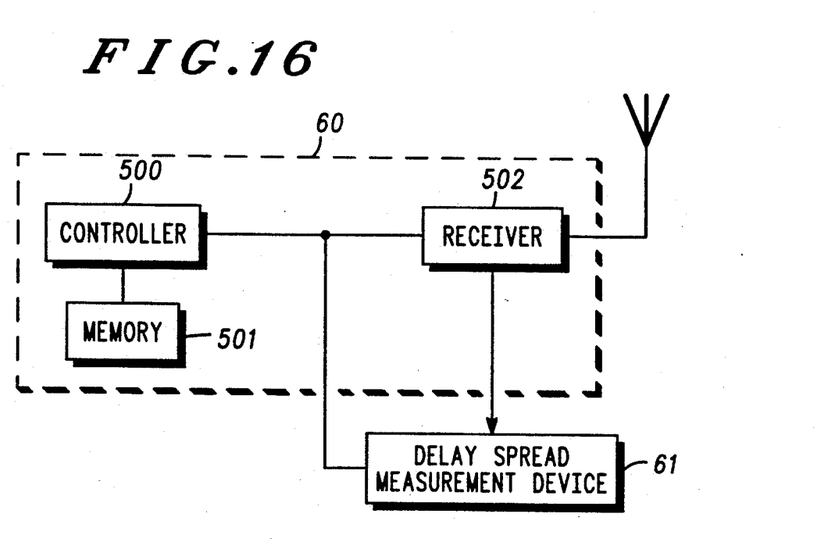
FIG. 16 comprises a block diagram of a receiver according to the invention.

FIG. 4 shows a simplified block diagram of a QAM receiver (502, FIG. 16) contained within a mobile communication unit receiver (60). A frequency preselector (62) detects the RF energy in the transmit spectrum shown in FIG. 2 and presents this information to an IF stage (64), the output of which is a zero IF signal, comprised of streams of complex quantities known or referred to as an in-phase and quadrature components of a zero-IF signal. This zero IF down converter (64) might include an automatic frequency control input that permits it to track shifts in frequency of the signal received by the receiver. A sync detection circuit (66) monitors these zero IF signals to find timing synchronization of the QAM symbols shown in the subchannels of FIG. 3. (Information in the QAM subchannels is transmitted as discrete packets, which are finite time periods of amplitude modulated and frequency shifted or phase modulated carrier signals. The sync detection circuit (66) includes circuitry to identify, from the synchronizing sequences added to the information in the QAM subchannels, when information in the QAM subchannels should be sampled for detection.)

The zero-IF signal from the zero-IF converter 64 is coupled to four subchannel receivers that each include subchannel mixers (65a through 65d) and receiver pulse-shaping filters (67a through 67d). The subchannel mixers multiply the zero-IF signal by a signal, $e^{-j2\pi f_i t}$, where $f_i$ is the subchannel center frequency for the respective subchannels, one through four, and t is time. The output of a subchannel mixer is a signal centered about zero Hertz, which is filtered by a pulse shaping filter (67a through 67d) to remove noise and any undesired subchannel signals.

The output of the pulse shaping filters is sampled at a rate determined by the sync detection circuit (66). The sampled outputs of the pulse shaping filters are input to symbol detector blocks (69a through 69d) that estimate the information symbols originally transmitted.

Automatic frequency control is provided by an AFC block (68). The AFC block (68) receives the sampled output of the pulse shaping filters during the times when sync symbols are present, as determined by the sync detection block (66). Stated alternatively, the AFC block only utilizes sync symbol samples, $x_{ij}$, (where i is the subchannel number and j is the sync symbol number) from the pulse shaping filters when sync symbols are present. The sync symbol samples, $x_{ij}$, correspond to the originally transmitted sync symbol vectors, $S_{ij}$. The output of the AFC block is coupled to the zero-IF down converter (64), or to possibly other frequency shifting stages between the preselector (62) and the symbol detectors (69a through 69d) to track received signal frequency shifts.

Figure 5:
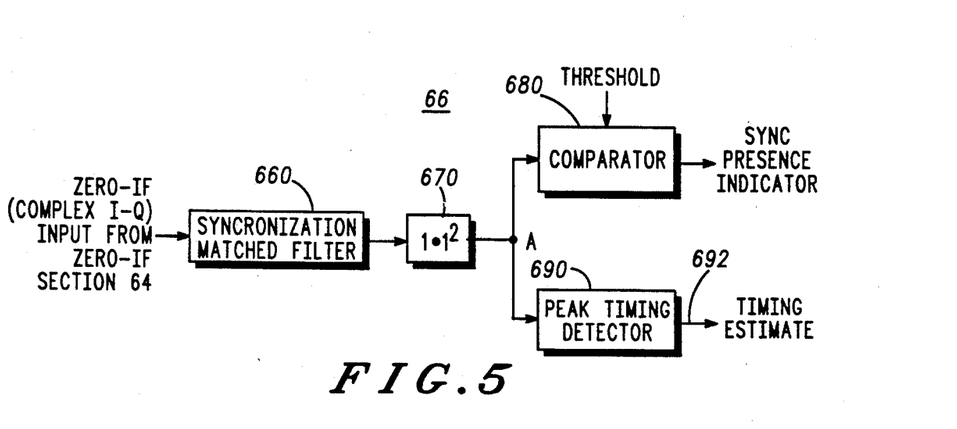
FIG. 5 comprises a block diagram of a synch detector for use within a QUAD 16 QAM receiver.

FIG. 5 shows a simplified block diagram of a sync matched filter and other circuitry associated with the sync detector (66) of FIG. 4 and within the receiver (60). After being down-converted to zero-IF by the zero-IF down converter (64), a complex zero IF is input to a sync matched filter (660) which is a filter whose impulse response closely approximates the complex conjugate of the time reversed transmitted composite waveform. (Whatever signal appears at the antenna of the transmitter has a net composite waveform from the addition of the QAM subchannels, including sync sequences. The sync matched filter (660) tests only for the waveform from the transmitter due to the sequences of sync symbols $S_{ij}$ where i is the subchannel number and j is the sync symbol time index, or number, sent. This filter (660) does not test for information in the QAM frame.)

Figure 5A:
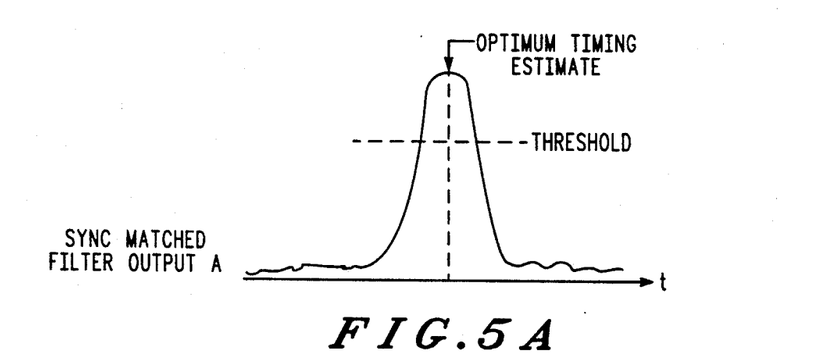
FIG. 5A depicts the output of a sync matched filter.

The output of the synchronization matched filter (660) is coupled to a magnitude squaring block (670) which computes the square of the amplitude of the sync matched filter (660) output and allows the determination of the power level of the signal detected by the sync matched filter (660). The output of the magnitude squaring block (670) is compared against a threshold in a comparator (680) to determine whether or not the sync matched filter (660) has found a synchronization pattern from the transmitter (10). (As shown in FIG. 5A, the threshold can be chosen to discriminate against noise.)

Still referring to FIG. 5, the output of the magnitude squaring block is also coupled to a peak timing detector circuit (690). The peak timing detector circuit (690) finds the time of the occurrence of the peak output value from the magnitude squaring block. The time of occurrence of the peak output value from the magnitude squaring block provides timing information of the QAM symbol times to enable accurate symbol sampling by the receiver (60). (In FIG. 4, the output (692) of the sync detection block (66) controls when symbols are to be acquired.)

In the preferred embodiment, the receiver elements shown in FIG. 4, excluding the preselector (62) and zero IF (64) are performed by a digital signal processor, such as a Motorola DSP 56000 family device.

It has been determined that if opposing subchannels (FIG. 3, 1 and 4, or 2 and 3) are loaded with sync vectors that are complex conjugates of each other, the waveforms produced by the addition of the modulated sync vectors requires a simplified receiver that must only identify a signal representing a resultant vector that has only real quantities. For example, referring to FIG. 2, if subchannel 1 and subchannel 4 are considered first and second halves of a pair of channels, both equally displaced and centered about the center frequency $f_o$ (40), and if subchannel 2 and subchannel 3 are considered as the first and second halves of a second pair of subchannels, both equally displaced from and about $f_o$, loading a complex vector $S_{11}$ into the synchronizing symbol for subchannel 1, and loading its complex conjugate $S_{41}$ into subchannel 4, (where $S_{11}{}^* = S_{41}$, and where the * denotes conjugate) produces (subsequent to pulse filtering and modulation) upon their addition a resultant signal that will have only a real component. Similarly, loading a complex vector $S_{21}$ into subchannel 2 and its complex conjugate $S_{31}$ into subchannel 3, (where $S_{31} = S_{21}{}^*$, where * denotes the conjugate) produces upon their addition a resultant signal that similarly has only real components.

Figure 8:
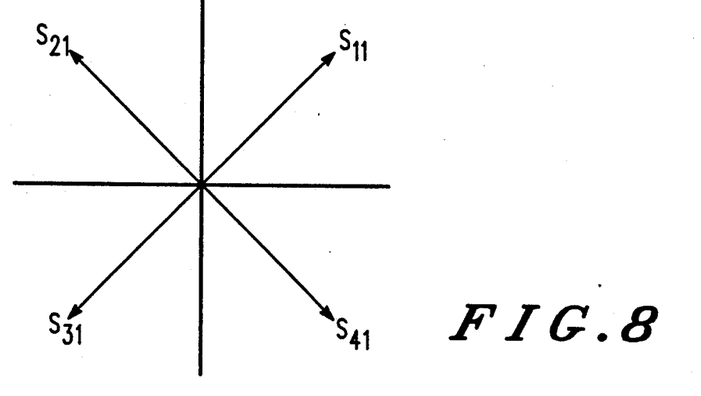
FIG. 8 depicts a phase diagram of conjugate sync symbols.

Referring to FIG. 8, there is shown a map of vectors and complex conjugates of these vectors that are used to simplify sync and timing detection for the receiver. The first sync vector $S_{11}$ is arbitrarily chosen at a 45 degree angle with a particular magnitude of M1. Its complex conjugate is used as the sync symbol for subchannel 4 and is shown as $S_{41}$. The sync symbols for subchannels 2 and 3 are also shown with the sync vector for subchannel 2 represented by $S_{21}$ and sync vector for subchannel 3 shown as $S_{31}$. Similar diagrams could be shown for other symbols occurring at a particular time, comprising sync sequences, i.e. $S_{12}$, $S_{22}$, $S_{32}$, $S_{42}$, etc.

Figure 6A:
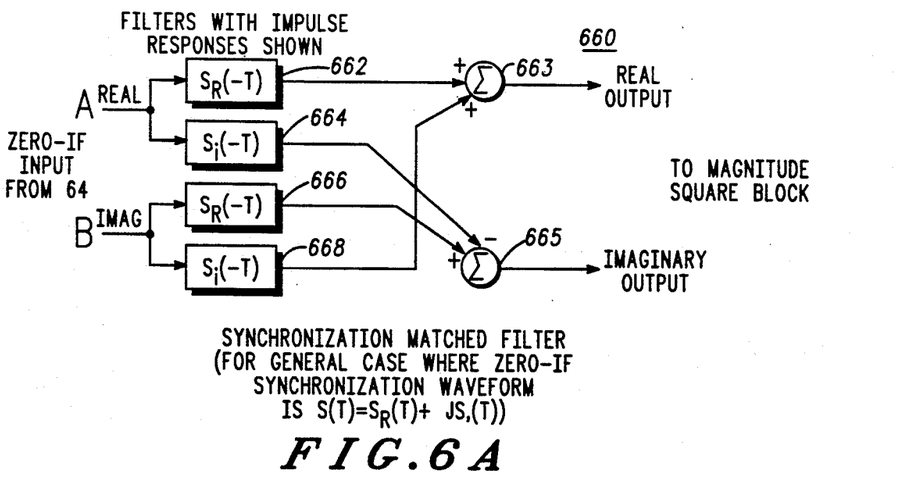
FIG. 6A comprises a sync detector for use within a QUAD 16 QAM receiver.

Simplified detection of the transmitted symbol timing and synchronization by inclusion of complex vectors and conjugates is accomplished by the sync matched filter shown in FIG. 6 and contained within the receiver (60). In FIG. 6A, the complex zero IF, denoted as the real portion (A) and the imaginary portion (B) couples to a group of complex filter elements (662, 664, 666, and 668). Each element has a real scalar input and real scalar output. The impulse response of this complex filter is matched to the quantity $s(t) = s_r(t) + js_i(t)$ where $s_r$ and $s_i$ are the real and imaginary components, respectively of s(t). S(t) represents the waveform of the composite of the sync symbol elements sent by the transmitter. The impulse response of the matched filter in general is approximately equal to $s^*(-t) = s_r(-t) - j\, s_i(-t)$. Since the input to the matched filter is a complex signal, the actual implementation requires four real-valued filters as shown in FIG. 6A.

Figure 6B:
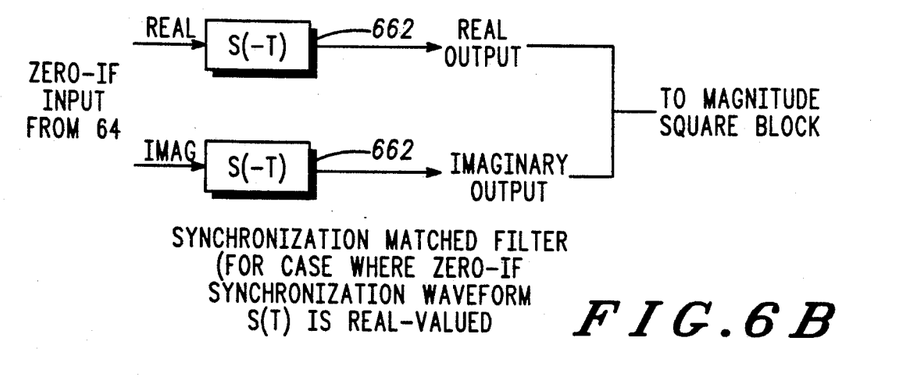
FIG. 6B comprises a simplified sync detector for use within a QUAD 16 QAM receiver.

A simplification of the receiver shown in FIG. 6A, and one which is made possible by the use of complex sync vectors and their complex conjugates in paired, or matched, QAM subchannels is shown in FIG. 6B.

In FIG. 6B, the complex zero IF signal is coupled to a filter matched to the waveform produced by sync vectors that are complex conjugates of each other and which when modulated and added together prior to transmission produce a constant phase waveform. The filter shown in FIG. 6B is considerably simpler than that shown in FIG. 6A.

It should be noted that in any multi-carrier QAM system described herein not all of the paired subchannels need to have the complex vector/complex conjugate vector sync sequences added to them. Of any multi-carrier QAM system, at least one pair of the paired subchannels must have the synchronizing sequence described herein added to it to permit simplified sync detection. (The requirement that the subchannels be centered about a center frequency still holds.)

As each complex sync vector is received on a channel (101a through 101d) sychronization is established by the receiver to transmitted signals. Synchronization of the receiver to the transmitter allows the receiver to accurately detect data and pilot symbols between synchronization symbols.

Inclusion of known pilot symbols allows a receiver to correct distortion induced into the signal during transmission. Pilot symbols, in one embodiment of the invention, may be inserted into the data as often as one pilot symbol to five data symbols as a means of measuring and correcting distortion within intervening data symbols. As each pilot symbol is received on a channel (101a through 101d) a distortion factor is calculated within the symbol detector (69). A complex representation of a received pilot is divided by a complex representation of the originally transmitted pilot symbol to produce a complex, pilot correction factor for that pilot. Two pilot correction factors, calculated from two sequential pilot symbols, are processed by interpolation over the data transmission slots between the two pilot symbols to produce a number of interpolated pilot correction symbols equal to the number of data symbols between pilot symbols. The data symbols are then processed by division by the interpolated pilot correction symbols to produce corrected data symbols having a corrected phase and amplitude for each channel.

The corrected data symbols are then compared with the constellation chart to determine the closest match. The closest match is assumed to be the correct, transmitted symbol.

In one embodiment of the invention an average signal quality factor (q) is calculated for the four channels used in the QUAD16QAM example using measured signal parameters comprised of the pilot correction factors and corrected data symbols. Signal quality factors are calculated values representative of delay spread and the ratio of carrier to interference plus noise $[C/(I+N)]$. A means of quickly and accurately measuring signal quality factors can be an important factor in efficient resource assignment and handoff. Given two possible resources, both of which have delay spreads within the design limits of the communication system, the resource with the best signal quality factor may provide the best relative quality signal transmission.

Figure 9:
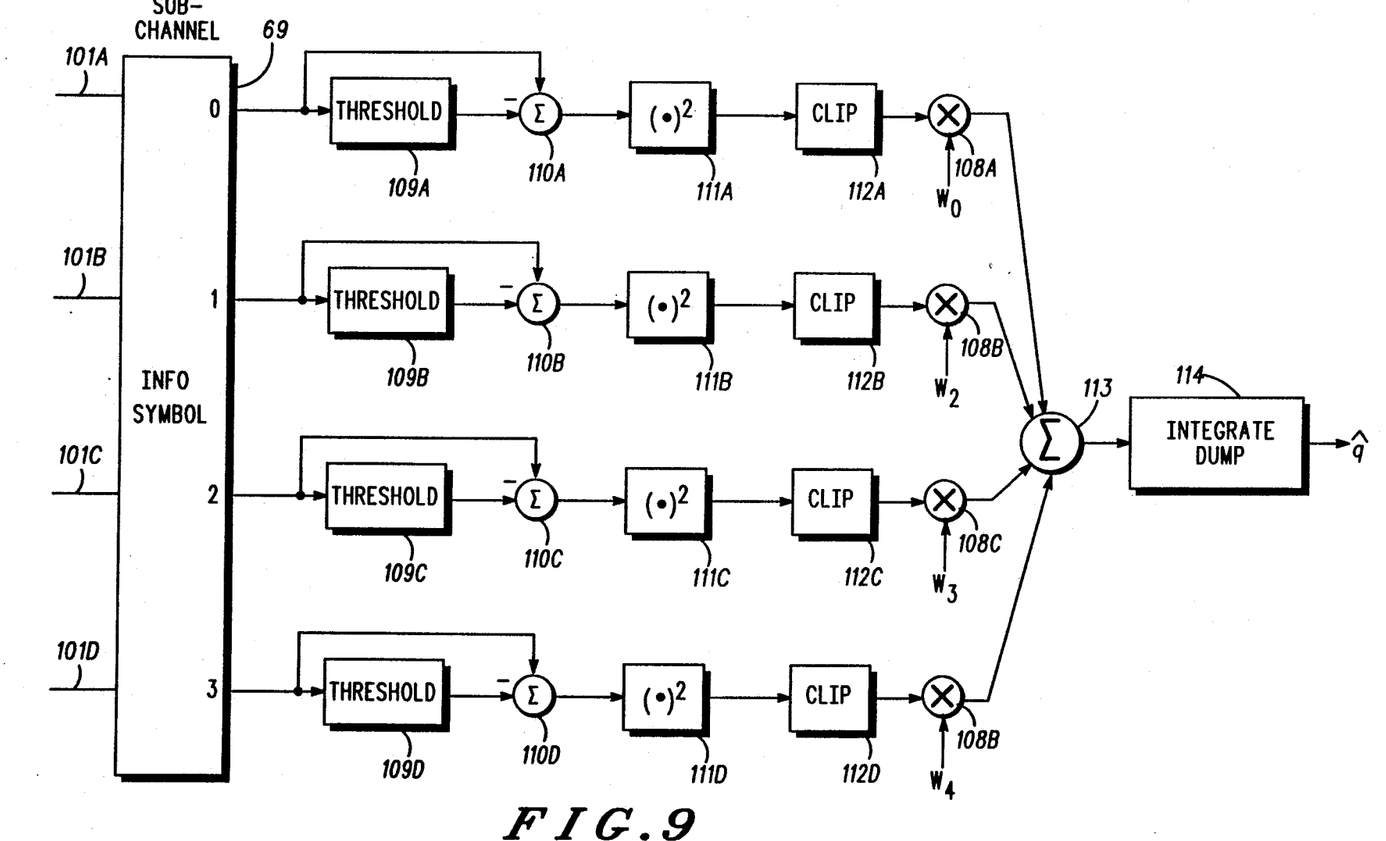
FIG. 9 a signal quality factor processor in accordance with the invention.
Figure 10:
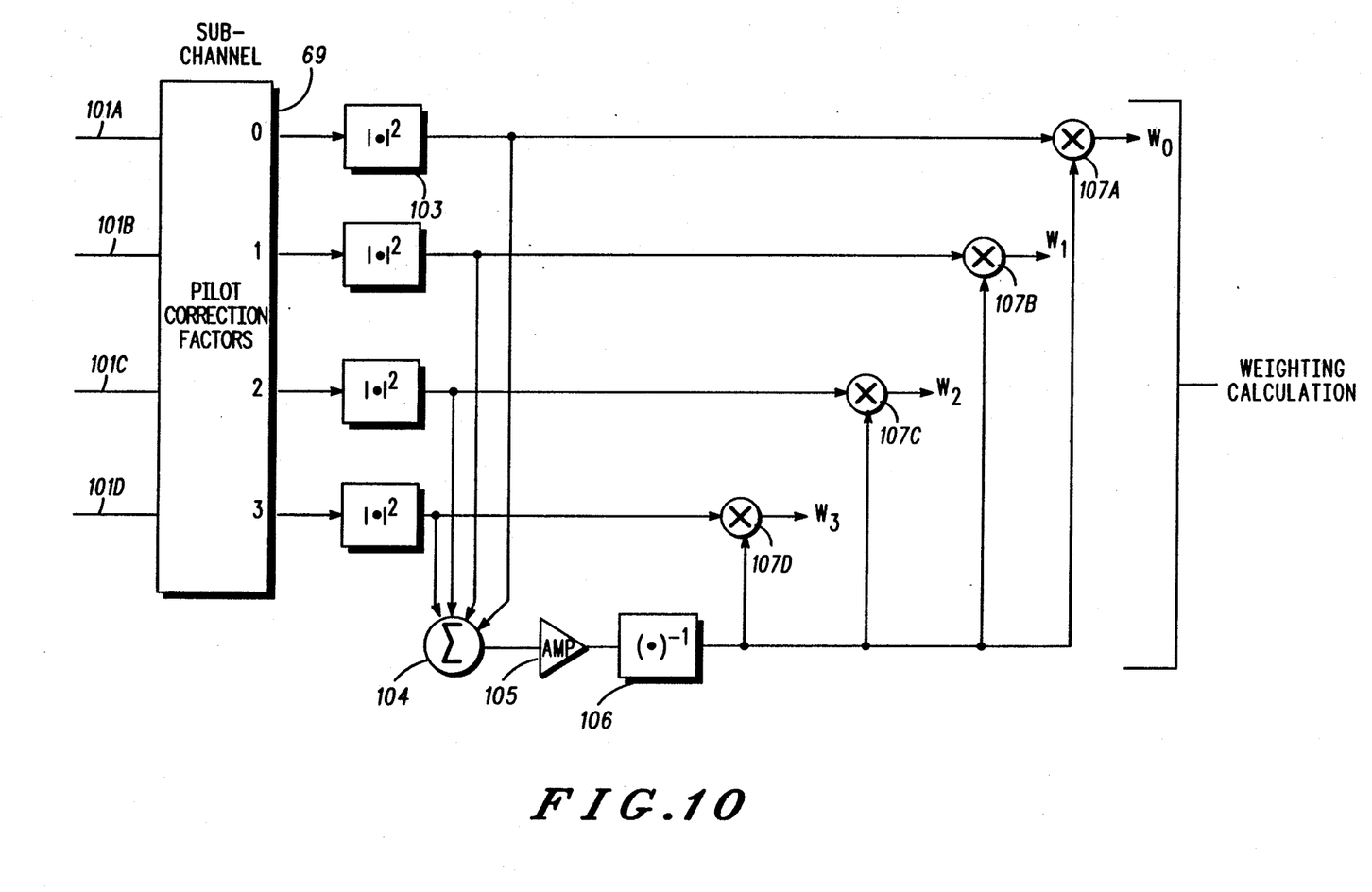
FIG. 10 comprises a weighting factor processing unit.
Figure 13:
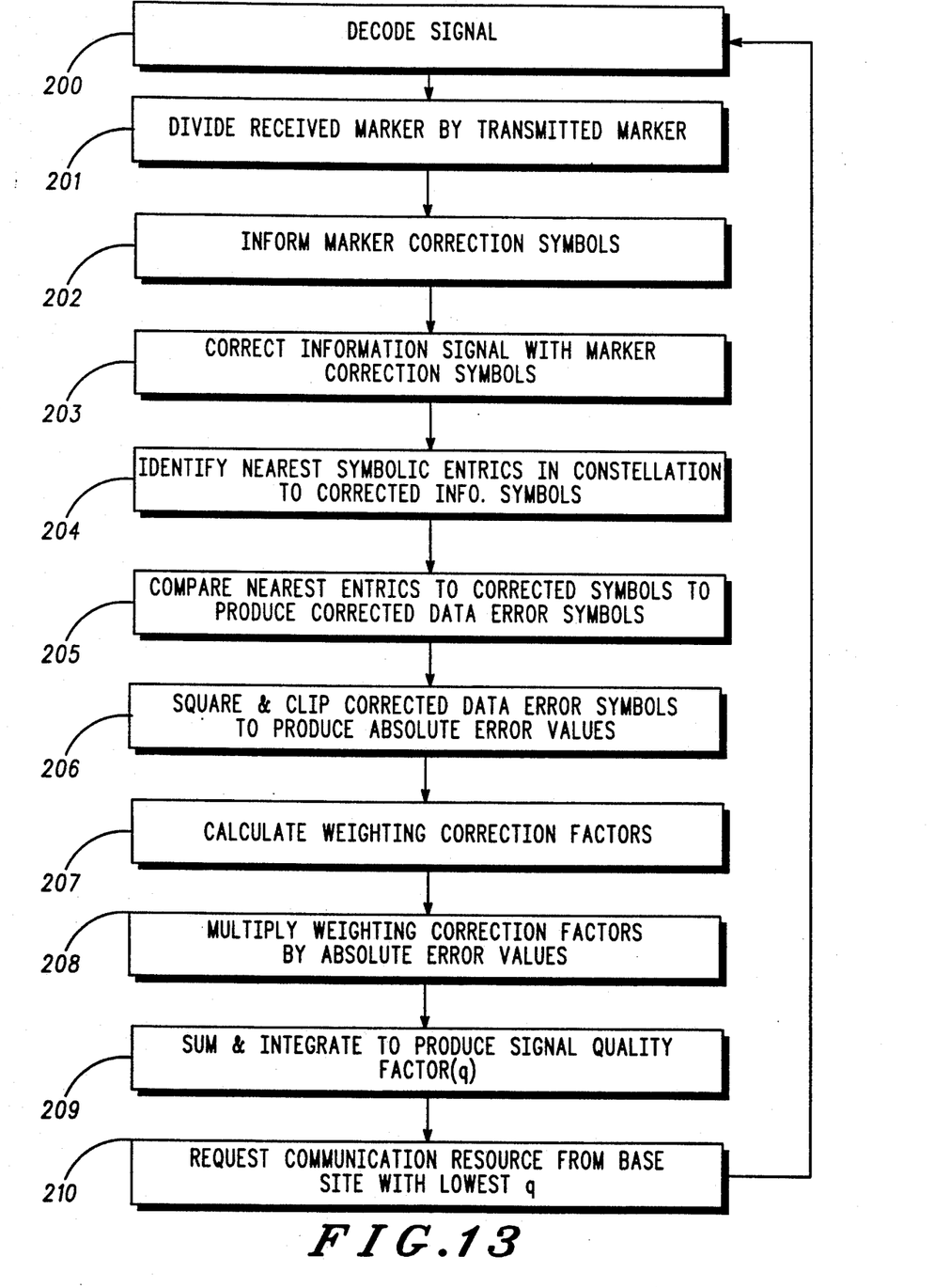
FIG. 13 comprises a flow chart for selecting the most reliable resource in accordance with the invention.

Calculation of the signal quality factor is accomplished through the inclusion of the signal processing elements shown in FIGS. 9 and 10 and included within the receiver (60). Shown in FIG. 13 is a flow chart by which the functions of the signal processing elements of FIGS. 9 and 10 and receiver 60 may be better understood.

The pilot correction factors are calculated as described above (FIG. 13, 200 and 201) for each channel (69, FIG. 10). Each pilot correction factor is squared (103) (207) to produce an absolute pilot value and to eliminate the imaginary components and then divided (107a through 107d) by a normalizing factor determined by summing (104) the absolute values, and amplifying (105) by an empirically determined factor. The result is four weighting factors ($w_0$ through $w_3$).

Instantaneous signal quality factors are calculated (209) by multiplying (108a through 108d) (208) absolute error values by the weighting factors ($w_0$ through $w_3$). Absolute error values are determined by selecting the corrected data symbols and determining the closest allowable data symbol to the corrected data symbol within a threshold detector (109a through 109d) (204). The corrected data symbol is subtracted from the closest allowable data symbol within an adder (110a through 110d) to produce data error values (205). The data error values are then squared (111a through 111d) to eliminate imaginary components and clipped (112a through 112d) to eliminate the effects of spurious symbols to produce an absolute error value (206).

The average signal quality factor (q) can be determined by summing (113) the instantaneous signal quality factors and integrating (114) (209) to produce the value q. Calculating an average signal quality factor q for a signal received on a communication resource allows for a comparison of the reliability of a communication path between a communication unit and a base site to determine the resource offering the highest reliability of performance (high reliability signal path).

Figure 11:
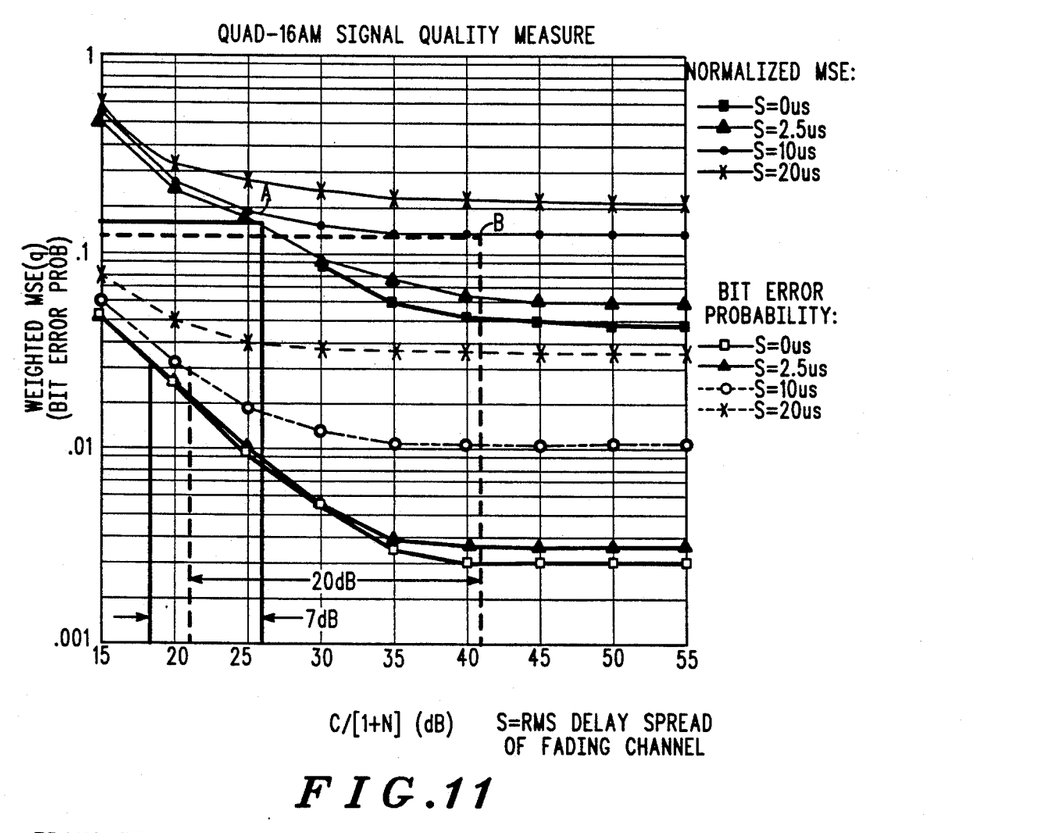
FIG. 11 comprises a computer simulation plotting the average signal quality factor for a number of operating conditions.

Shown (FIG. 11) is a computer simulation of calculated signal quality factor (q) for a four received signals (delay spreads of 0.0, 2.5, 10 and 20 μs) and over a range of signal to interference plus noise (C/[I+N]) ratios. Also shown on the same graph (FIG. 11) are calculated bit error rates for the same four signals and over the same range of signal to interference plus noise (C/[I+N]) ratios. In use a communication unit would calculate q and request service on a high reliability resource from the base site offering the lowest relative, calculated value of q.

By way of example a communication unit (comprising a receiver (60) and optional delay measurement device (61)) detects signals from a first and a second base site transmitter (10) within small geographic areas (301 and 302). The communication unit (60 and 61) calculates a signal quality factor for each. The delay spread for the first base site signal may be assumed to be zero (S=0 μs) or the delay spread may be communicated to the receiver (60) on a control channel from the first base site as a locally measured condition. The calculated value of q is 0.18. A controller (500, FIG. 16) within the receiver (60) enters the graph (FIG. 11) stored within a memory (501) of the receiver (60) based upon the calculated value for the first site identifies a first point (A) and a first value of C/[I+N] of approximately 26 db.

The second base site may have a communicated delay spread of ten microseconds (S=10 μs) and a calculated value of q of 0.14. Entering the graph (FIG. 11) based upon the calculated value identifies a second point (B) and a second value of C/[I+N] of 41 db. Based on the lowest calculated value of q the highest reliability communication resource selected by the controller (500) is that offered by the second base site (q=0.14). Based upon the lowest calculated value of q the communication unit (60 and 61) would request a communication resource from the second base site.

Figure 15:
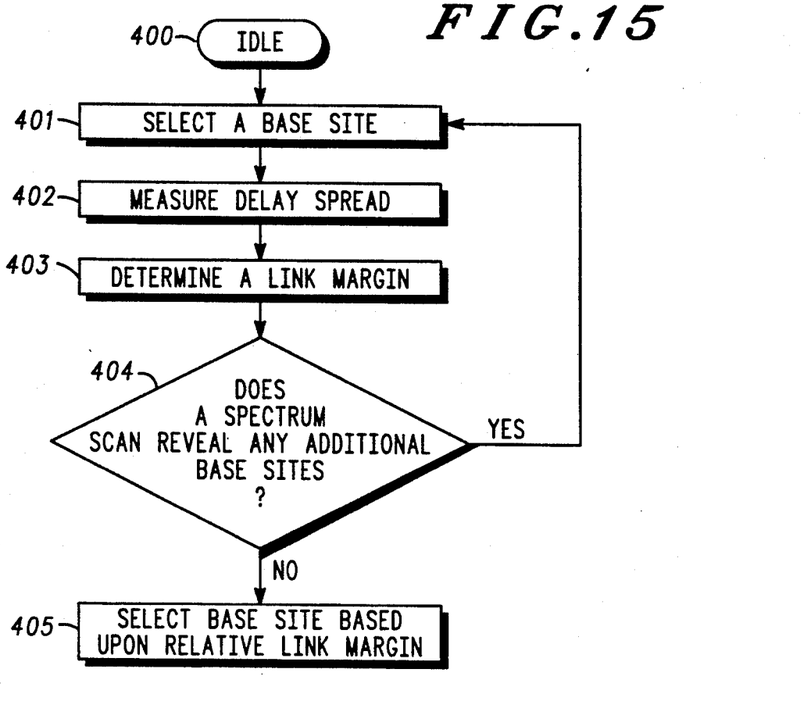
FIG. 15 comprises a flow chart of base site selection under the invention.

According to the invention a communication unit (60 and 61) may calculate the delay spread using prior art methods based upon measured parameters by the delay spread measurement device (61) of the detected signal and would request service based on an algorithm (FIG. 15) calculating the highest decibel range between a detected signal and an unacceptable signal (unacceptable bit error rate) based on the calculated curve upon which the signal is operating.

In the above example since delay spread is known (through measurement) the graph (FIG. 11) stored within a memory (not shown) of the receiver (60) can be used to determine projected bit error rates. The projected bit error rate of the first base site can be determined within the controller (500) by extending a line vertically down from point A. The intersection of the vertical line from point A and the bit error probability line for zero delay spread (S=0 μs) occurs at substantially 0.9%. The projected bit error rate for the second base site (point B) can be determined in a substantially identical manner and in the example given for point B gives an indicated bit error rate of 1.1%.

If an algorithm for assigning communication resources within a communication system is based upon the lowest bit error rate then the example indicates that the first base site may offer the most reliable resource. If, on the other hand, an unacceptable bit error rate is established (say 3%) then a channel reliability factor can be calculated for each base site based on a decibel range between the projected bit error rate and the unacceptable bit error rate. In the example the second base site offers a 20 db margin between the detected signal (1.1% bit error rate) and an unacceptable bit error rate (3%). The first base site offers a 7 db margin between the detected signal (0.9%) and an unacceptable signal (3%). If resource assignment is based upon resistance to signal fading, then the controller (500) would select the communication resource offering a high reliability signal path may be the path between the second base site and the communication unit.

In another embodiment of the invention other constellation charts may be used in the transmission, reception, and subsequent detection of information signals. Examples include QPSK, 8PSK, 8AMPM, etc.

In a further embodiment of the invention any number of subchannels may be used in the transmission, reception, and subsequent detection of information signals. The number of subchannels may be described as ranging from one to n.

We claim:

1. In an RF signalling environment a method of selecting a high reliability signal path between a receiver within a communication unit and a plurality of transmitters, each transmitting an information signal from a base site, based upon a comparison of measured delay spreads and average signal quality factors calculated from measured signal parameters with delay spreads and parameters received from at least some of the plurality of base site transmitters, such method including the steps of:

A) measuring a delay spread and calculating a signal quality factor from measured signal parameters of a first information signals received from a first transmitter of the plurality of base site transmitters;

B) determining a first link margin based upon the measured delay spread and the signal quality factor of the first information signal;

C) measuring a delay spread and calculating a signal quality factor from measured signal parameters of an at least second information signal received from an at least second transmitter of the plurality of base site transmitters;

D) determining an at least second link margin based upon measured delay spread and the signal quality factor of the at least second information signal; and, E) selecting a high reliability signal path based, at least in part, upon the largest relative link margin.

2. In an RF signalling environment an apparatus for selecting a high reliability signal path between a receiver within a communication unit and a plurality of transmitters, each transmitting an information signal from a base site, based upon a comparison of measured delay spreads and average signal quality factors calculated from measured signal parameters with delay spreads and parameters received from at least some of the plurality of base site transmitters, such apparatus comprising A) means for measuring a delay spread and calculating a signal quality factor from measured signal parameters of a first information signals received from a first transmitter of the plurality of base site transmitters;

B) means for determining a first link margin based upon the measured delay spread and the signal quality factor of the first information signal;

C) means for measuring a delay spread and calculating a signal quality factor from measured signal parameters of an at least second information signal received from an at least second transmitter of the plurality of base site transmitters;

D) means for determining an at least second link margin based upon measured delay spread and the signal quality factor of the at least second information signal; and, E) means for selecting a high reliability signal path based, at least in part, upon the largest relative link margin.

* * * * *